(12) United States Patent
Lin et al.

(10) Patent No.: US 7,588,805 B2
(45) Date of Patent: Sep. 15, 2009

(54) TRANSFLECTIVE LIQUID CRYSTAL PANEL AND METHOD OF MAKING THE SAME

(75) Inventors: Tzu-Yuan Lin, Taipei (TW); Chun-Hung Chiang, Tainan County (TW); Chih-Chuan Chen, Changhua County (TW); Fu-Cheng Sie, Taichung County (TW); Chia-Hsing Sun, Taipei (TW); Jin-Jei Wu, Taipei (TW)

(73) Assignee: AU Optronics Corp., Hsin-Chu (TW)

( * ) Notice: Subject to any disclaimer, the term of this patent is extended or adjusted under 35 U.S.C. 154(b) by 306 days.

(21) Appl. No.: 11/536,697

(22) Filed: Sep. 29, 2006

(65) Prior Publication Data
US 2008/0014372 A1  Jan. 17, 2008

(30) Foreign Application Priority Data
Jul. 12, 2006  (TW) ............... 95125475 A

(51) Int. Cl.
C09K 19/00 (2006.01)
C09K 19/06 (2006.01)
C09K 19/52 (2006.01)

(52) U.S. Cl. .......... 428/1.1; 430/20; 349/117; 252/299.01

(58) Field of Classification Search ........ 252/299.01; 428/1.1; 430/20; 349/117
See application file for complete search history.

(56) References Cited

U.S. PATENT DOCUMENTS

| | | | |
|---|---|---|---|
| 5,847,798 A | 12/1998 | Yang et al. | |
| 6,061,107 A | 5/2000 | Yang et al. | |
| 6,657,689 B2 * | 12/2003 | Baek | 349/114 |
| 6,801,281 B2 | 10/2004 | Huang et al. | |
| 6,917,404 B2 * | 7/2005 | Baek | 349/114 |
| 6,922,219 B2 | 7/2005 | Jin et al. | |
| 6,977,702 B2 | 12/2005 | Wu | |
| 7,161,647 B2 * | 1/2007 | Iijima | 349/113 |
| 2004/0114076 A1 | 6/2004 | Liao et al. | |
| 2006/0023146 A1 | 2/2006 | Yang | |

FOREIGN PATENT DOCUMENTS

JP   2004-317908   11/2004

OTHER PUBLICATIONS

Ma Ji,Liu Yong-Gang,Song Jing,Peng Zeng-Hui,Ruan Sheng-Ping,Xuan Li, The Prepare and Study of Polymer Network Stabilized Liquid Crystal Film,Chinese Journal of Light Scattering, Jan. 2005, p. 374~p. 378,vol. 16 No. 4.

* cited by examiner

*Primary Examiner*—Geraldina Visconti
(74) *Attorney, Agent, or Firm*—Winston Hsu

(57) ABSTRACT

A transflective liquid crystal panel includes a first substrate, a second substrate, a first polarizer disposed on the first substrate, a second polarizer disposed on the second substrate having a transmission axis perpendicular to that of the first polarizer and a polymer dispersed liquid crystal layer sandwiched between the substrates. The polymer dispersed liquid crystal layer includes a plurality of liquid crystal molecules and at least one polymer network. When a voltage difference between the substrates is equal to 0V, the liquid crystal molecules do not reflect incident light beams and are not pervious to incident light beams. When the voltage difference between the substrates is not equal to 0V, the crystal molecules reflect incident light beams and are pervious to incident light beams.

25 Claims, 12 Drawing Sheets

TRANSFLECTIVE LIQUID CRYSTAL PANEL AND METHOD OF MAKING THE SAME

This application claims the benefit of Taiwan Patent Application Serial No. 95125475, filed Jul. 12, 2006, the subject matter of which is incorporated herein by reference.

BACKGROUND OF THE INVENTION

1. Field of the Invention

The present invention relates to a transflective liquid crystal panel, and more specifically, to a liquid crystal panel in which liquid crystal molecules have both transmissive and reflective functions by using a polymer network.

2. Description of the Prior Art

According to the source of illuminating light, the liquid crystal display can be divided into three kinds, i.e., transmissive, reflective, and transflective modes. The transmissive liquid crystal display has a backlight for producing light. The light produced by the backlight will pass through the liquid crystal panel to let a user see the image displayed on the liquid crystal display screen. The reflective liquid crystal display has a reflective electrode. When displaying the image, the ambient light of the reflective liquid crystal display will enter the liquid crystal display from the observer side of the user and then be reflected by the reflective electrode. The reflected light will pass through the liquid crystal panel again, and finally the user can see the image displayed on the liquid crystal display. In addition, the transflective liquid crystal display both has the liquid crystal display of transmissive mode and reflective mode. In other words, each pixel area comprises both a transmissive area and a reflective area, wherein the transmissive area uses a backlight, and the reflective area uses an ambient light as a light source.

FIG. 1 is a schematic diagram of a prior art transflective liquid crystal panel. As shown in FIG. 1, the transflective liquid crystal panel 10 comprises an array substrate 12, a color filter substrate 14 and a liquid crystal molecules layer 16 disposed between the array substrate 12 and the color filter substrate 14. The array substrate 12 comprises a plurality of pixel areas 18, and each pixel area 18 both comprises a reflective area 181 and a transmissive area 182. The array substrate 12 also comprises a plurality of thin-film transistors (not shown in figures) respectively disposed in each reflective area 181, a plurality of reflective electrodes 20 disposed on the thin-film transistors, and a plurality of transmissive electrodes (not shown in figures) disposed in the transmissive area 182. In addition, there is a dielectric layer 22 between the reflective electrode 20 and the thin-film transistor.

Because the transmissive area 182 of the transflective liquid crystal panel 10 uses backlight, the light will pass through the liquid crystal molecules layer 16 only one time. The reflective area uses the ambient light as a light source, so the light will pass through the liquid crystal molecules layer 16 twice. In such a case, because the phase difference in the reflective area 181 is twice that in the transmissive area 182, the relation of reflectance versus voltage mismatches the relation of transmittance versus voltage while driving the liquid crystal molecules. For this reason, the prior art transflective liquid crystal panel 10 uses a design of a double cell gap to solve the mismatching problem. More specifically, in the prior art transflective liquid crystal panel 10, a function of the dielectric layer 22 disposed under the reflective electrode 20 is to adjust a cell gap of the liquid crystal molecules layer 16. By disposing the dielectric layer 22, the cell gap of the liquid crystal molecules layer 16 in reflective area 181 is smaller than the cell gap in the transmissive area 182, so the phase difference in a light passing through the reflective area 181 is the same with the one in the light passing through the transmissive area 182. Then, the mismatched problem of driving voltages in the reflective area 181 and in the transmissive area 182 is improved. However, a step of fabricating the dielectric layer 22 in the reflective area 181 has to be increased in the double cell gap design of the transflective liquid crystal panel 10. Further, the increased step not only increases process time and cost but also affects product yield. Importantly, a gap of the border between the reflective area 181 and the transmissive area 182 will make the liquid crystal molecules difficult to align, thereby lowering the quality of displayed images. Besides, although the prior art transflective liquid crystal panel 10 has the design of a single cell gap, the method of utilizing the single cell gap uses different controlling electric circuits that respectively drive the reflective area 181 and the transmissive area 182. Therefore, not only is the arranged complexity of the array substrate increased, but also the driving method thereof is more complicated.

SUMMARY OF THE INVENTION

It is therefore a primary objective of the present invention to provide a transflective liquid crystal panel and method of making the same for solving the problem that the prior art encounters.

According to a preferred embodiment of the present invention, a transflective liquid crystal panel is provided. The transflective liquid crystal panel comprises a first substrate, a second substrate, a first polarizer disposed on the first substrate, a second polarizer disposed on the second substrate having a transmission axis perpendicular to that of the first polarizer and a polymer dispersed liquid crystal layer, sandwiched between the substrates, comprising a plurality of liquid crystal molecules and at least one polymer network. When a voltage difference between the first and the second substrates is not equal to 0V, the liquid crystal molecules reflect and/or are pervious to the incident light, and when the voltage difference is equal to 0V, the liquid crystal molecules do not reflect and/or are pervious to the incident light.

According to another preferred embodiment of the present invention, a transflective liquid crystal panel is provided. The transflective liquid crystal panel comprises a first substrate, a second substrate, a first polarizer disposed on the first substrate, a second polarizer disposed on the second substrate having a transmission axis perpendicular to that of the first polarizer and a polymer dispersed liquid crystal layer, sandwiched between the substrates, comprising a plurality of liquid crystal molecules and at least one polymer network. A birefringence of the polymer network is substantially equal to that of the liquid crystal molecules. When a voltage difference between the first and the second substrates is equal to 0V, the liquid crystal molecules reflect and/or are pervious to the incident light, and when the voltage difference is not equal to 0V, the liquid crystal molecules do not reflect and/or are pervious to the incident light.

According to another preferred embodiment of the present invention, a transflective liquid crystal panel is provided. The transflective liquid crystal panel comprises a first substrate, a second substrate, a first polarizer disposed on the first substrate, a second polarizer disposed on the second substrate having a transmission axis perpendicular to that of the first polarizer and a polymer dispersed liquid crystal layer sandwiched between the substrates and comprising a plurality of liquid crystal molecules and at least one polymer network. The polymer network is polymerized by a plurality of precursors, and each precursor comprises fluoride and hydrocarbon having benzene or biphenyl. Each precursor also includes one to eight fluorine atoms. The hydrocarbon includes an aliphatic hydrocarbon chain served as a linking group, and the aliphatic hydrocarbon chain includes one to twenty-two carbon atoms.

According to a preferred embodiment of the present invention, a method of fabricating the transflective liquid crystal panel is provided. The method of fabricating the transflective liquid crystal panel starts with providing a pair of substrates disposed in parallel, and a polymer dispersed liquid crystal layer is sandwiched between the substrates. The polymer dispersed liquid crystal layer comprises a plurality of liquid crystal molecules and a plurality of precursors. Each precursor comprises fluoride and hydrocarbon including benzene or biphenyl, and each precursor comprises one to eight fluorine atoms. The hydrocarbon includes an aliphatic hydrocarbon chain served as a linking group, and the aliphatic hydrocarbon chain includes one to twenty-two carbon atoms. Then, a polymerizing process is performed to polymerize the precursors to be a polymer network.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
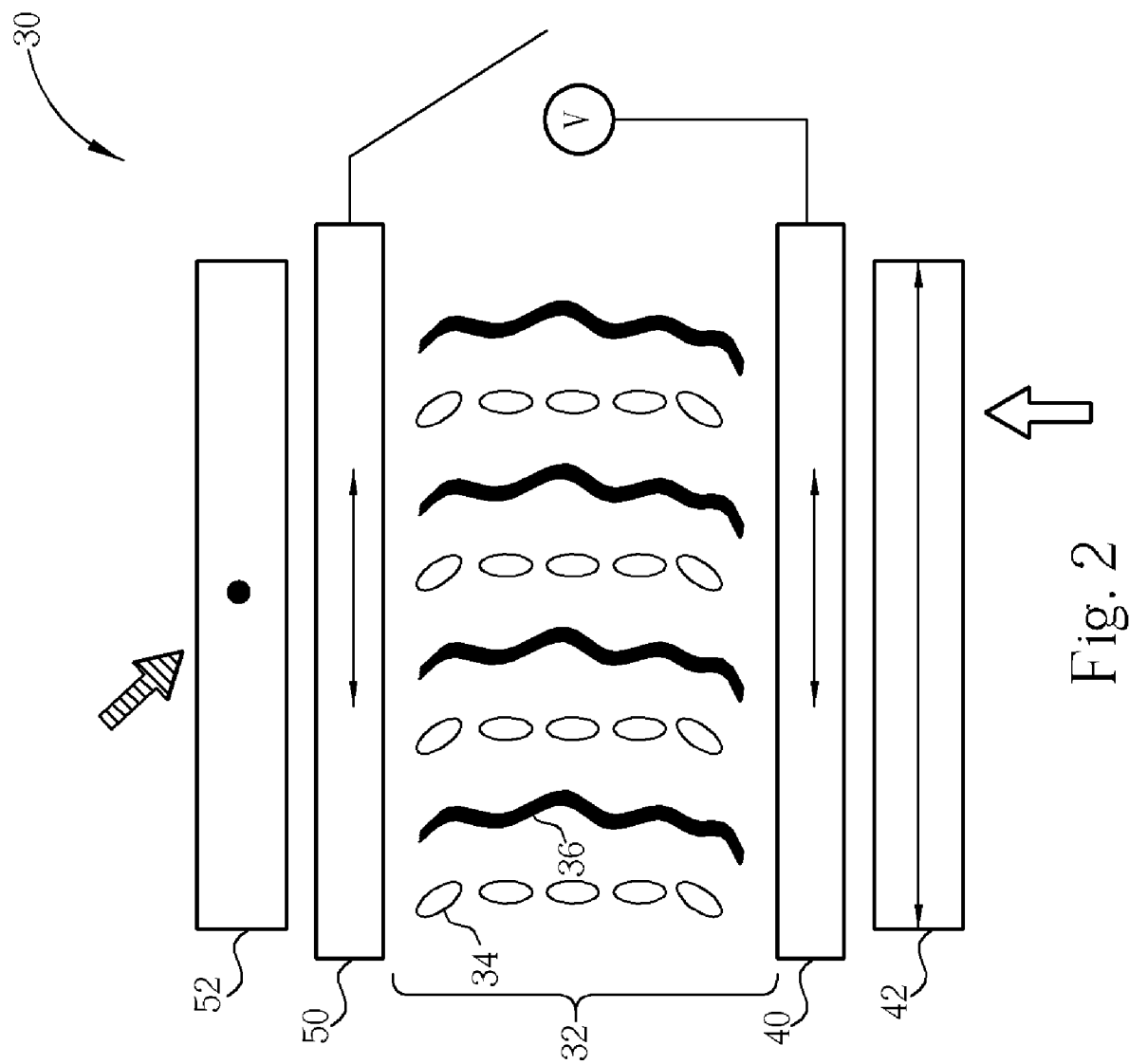
FIG. 2 and FIG. 3 are schematic diagrams of a transflective liquid crystal panel according to two preferred embodiments of the present invention.
Figure 3:
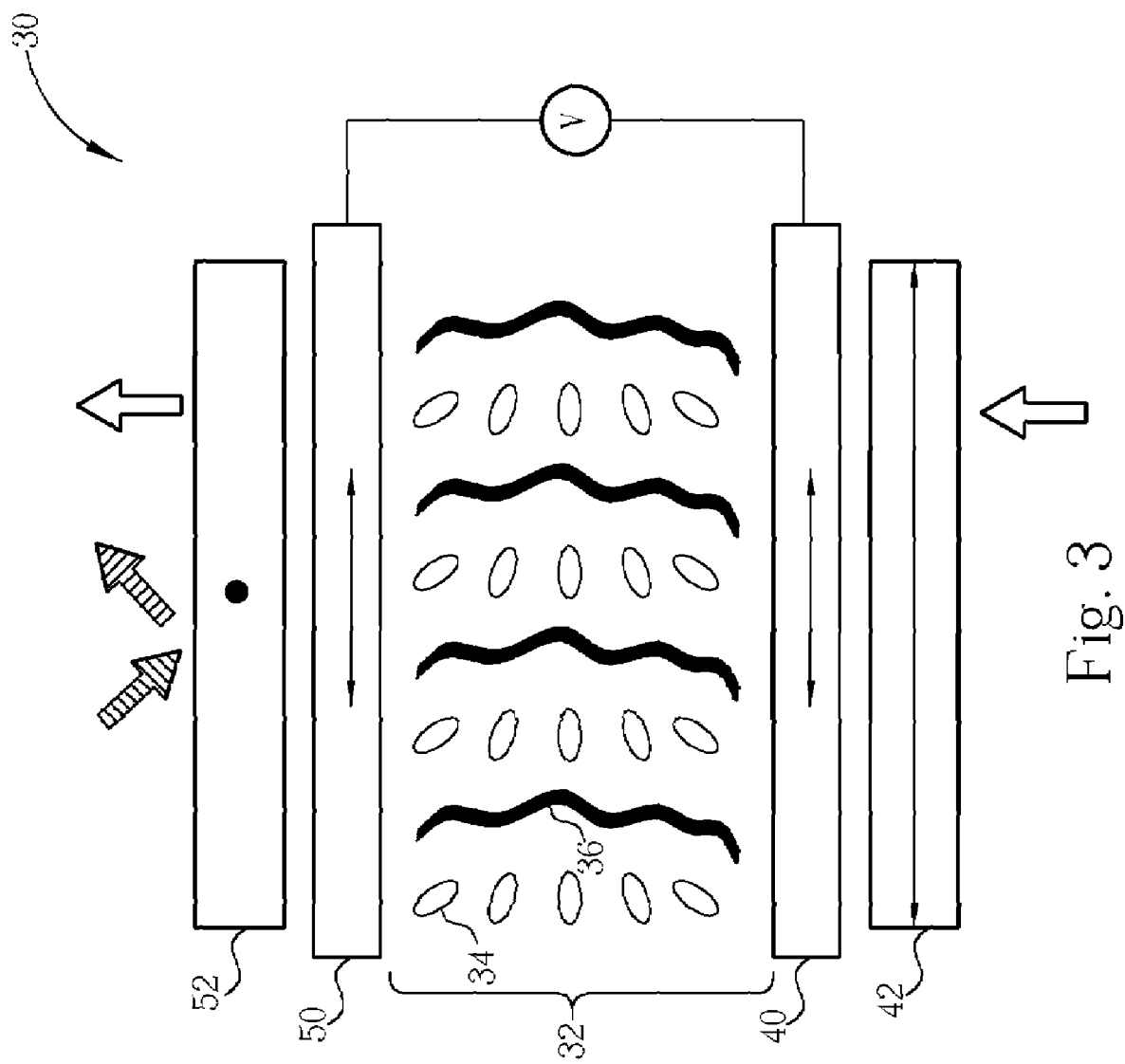

FIGS. 2 and 3 are schematic diagrams of a transflective liquid crystal panel according to two preferred embodiments of the present invention. FIG. 2 is a schematic diagram of a transflective liquid crystal panel when a voltage difference is equal to 0V. FIG. 3 is a schematic diagram of a transflective liquid crystal panel when a voltage difference is not equal to 0V. As shown in FIG. 2 and FIG. 3, a transflective liquid crystal panel 30 comprises a first substrate such as an array substrate 40, a second substrate disposed parallel to the first substrate such as an color filter substrate 50, a first polarizer 42 disposed on the array substrate 40, a second polarizer 52 disposed on the color filter substrate 50 and a polymer dispersed liquid crystal (PDLC) layer 32 disposed between the array substrate 40 and the color filter substrate 50. The polarizers 42, 52 have a transmissive axis respectively, and the two transmissive axes are perpendicular to each other (as indicated by an arrow of FIG. 2 and FIG. 3). The polymer dispersed liquid crystal layer 32 comprises a plurality of liquid crystal molecules 34 and at least one polymer network 36.

The transflective liquid crystal panel 30 according to the embodiment is a normally black panel of an optical compensated splay mode. Therefore, the liquid crystal molecules 34 are homeotropically aligned negative liquid crystal molecules, and the array substrate 40 and the color filter substrate 50 are horizontally aligned and two horizontally aligned directions of the substrates are parallel to each other (as indicated by an arrow of FIG. 2 and FIG. 3). As shown in FIG. 2, when a voltage difference between the array substrate 40 and the color filter substrate 50 is equal to 0V, the liquid crystal molecules 34 relative to the array substrate 40 and relative to the color filter substrate 50 respectively have pretilt angles and the two pretilt angles are arranged parallel to each other. For this reason, the liquid crystal molecules 34 will be arranged in homeotropic alignment along the two pretilt angles mentioned above. As shown in FIG. 3, when the voltage difference is not equal to 0V, the liquid crystal molecules 34 will be arranged in the optical compensated splay mode. In other words, the liquid crystal molecules affected by the polymer network reflect and/or are pervious to the incident light beams.

One of major functions of the polymer network according to the present invention is to affect transmittance and reflectance of the liquid crystal molecules 34, so when the voltage difference is equal to 0V, the liquid crystal molecules 34 do not reflect and/or are not pervious to incident light beams. In other words, the liquid crystal molecules 34 are not pervious to a backlight, and do not reflect an ambient light. When the voltage difference is not equal to 0V, the polymer network 36 will affect the liquid crystal molecules 34 to be pervious to the backlight and scatter the backlight and to reflect and scatter the ambient light. It is worthy to mention that the polymer network 36 has a function to increase the pretilt angle of the liquid crystal molecules 34 and accelerate the transition time of the liquid crystal molecules 34. As discussed above, the transflective liquid crystal panel 30 can be the design of a single cell gap, not a double cell gap, by disposing the polymer network 36 so that the complexity of the process can be simplified and the total yield is increased. Furthermore, although the transflective liquid crystal panel 30 according to the present embodiment has both the reflective mode and the transmissive mode, while displaying the image, the liquid crystal molecules 34 of each pixel area that can simultaneously perform two functions of the transmittance and the reflectance dependant on the polymer network 36.

The precursor of the polymer network 36 according to the present embodiment includes fluoride and hydrocarbon including benzene or biphenyl, wherein each precursor includes one to eight fluorine atoms, hydrocarbon includes an aliphatic hydrocarbon chain served as a linking group, and the aliphatic hydrocarbon chain includes one to twenty-two carbon atoms.

Figure 4:
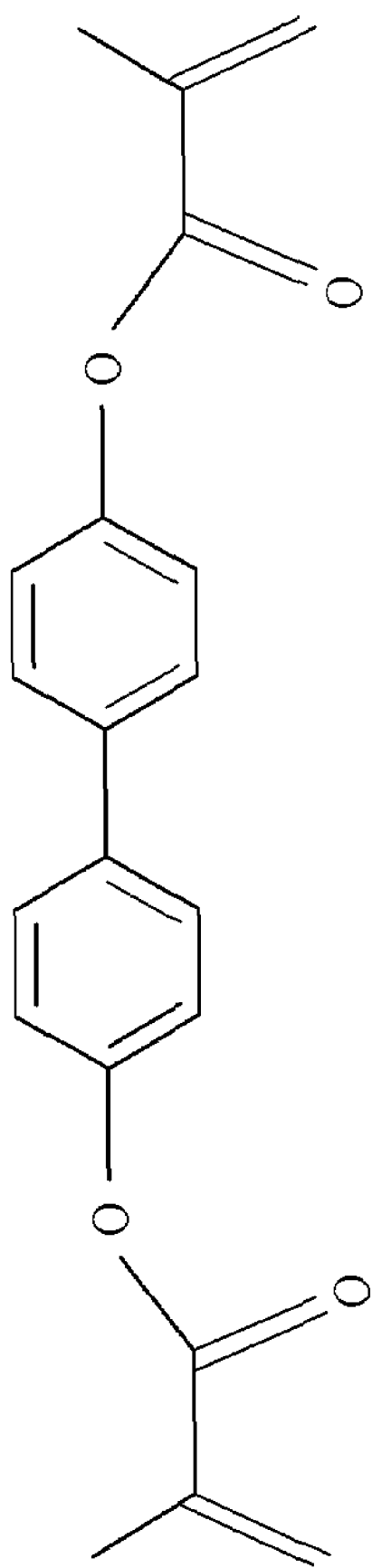
FIG. 4 and FIG. 5 are chemical structures of a precursor used in a polymer network according to two embodiments of the present invention.
Figure 5:
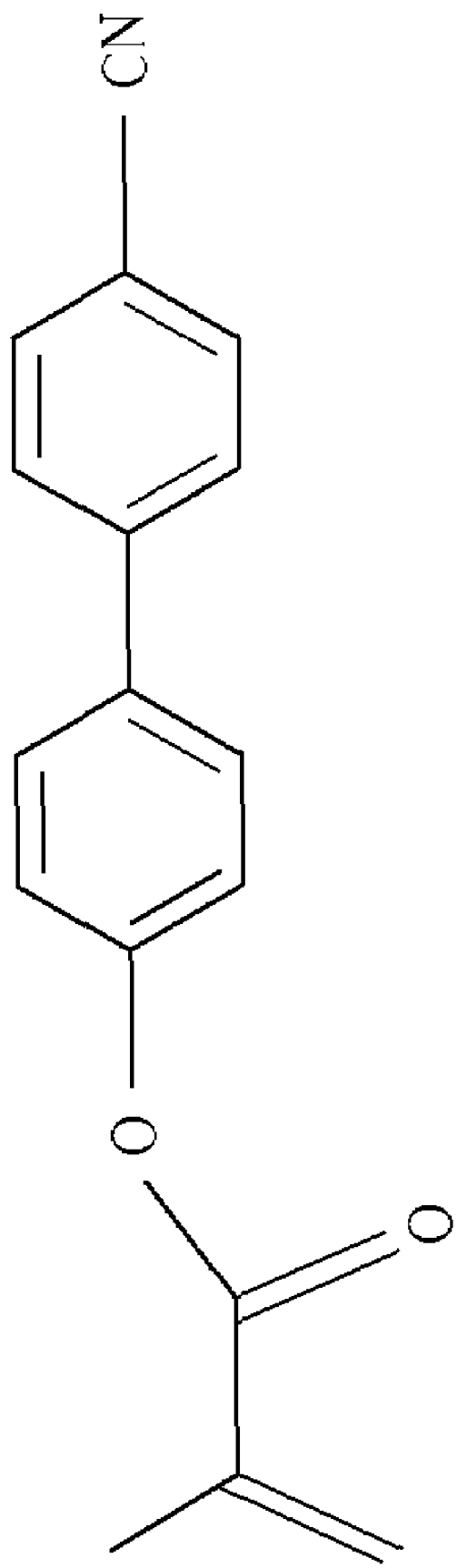

FIGS. 4 and 5 are chemical structures of a precursor used in a polymer network according to two embodiments of the present invention. In addition, in the embodiments of the present invention, the precursors are substantially in the range of 2% to 20% of the liquid crystal molecules by weight, but the precursor should not be limited to this. Moreover, the precursor can be an ultraviolet-polymerizable compound or a heat-polymerizable compound. It is worthy to mention that because the function of the polymer network is to affect the transmittance and the reflectance of the liquid crystal molecules 34, the characteristic of the precursor should be compatible with the characteristic of the liquid crystal molecules in choosing the material of the precursor. For example, the precursor and the liquid crystal molecules should be able to mix with each other. In addition, the birefringence of either the precursors or the polymer network polymerized by the precursors needs to be substantially equal to that of the liquid crystal molecules. Therefore, the polymer network will not affect the normal display function of the liquid crystal panel when the liquid crystal molecules perform the function of transmitting and reflecting. Besides, because the proportion of the polymer network 36 in polymer dispersed liquid crystal layer 38 is not high, the driving voltage of the liquid crystal molecules will not be raised. Otherwise, in the embodiment, the polymer network is polymerized by heating or lighting with ultraviolet when the voltage difference is equal to 0V.

Figure 1:
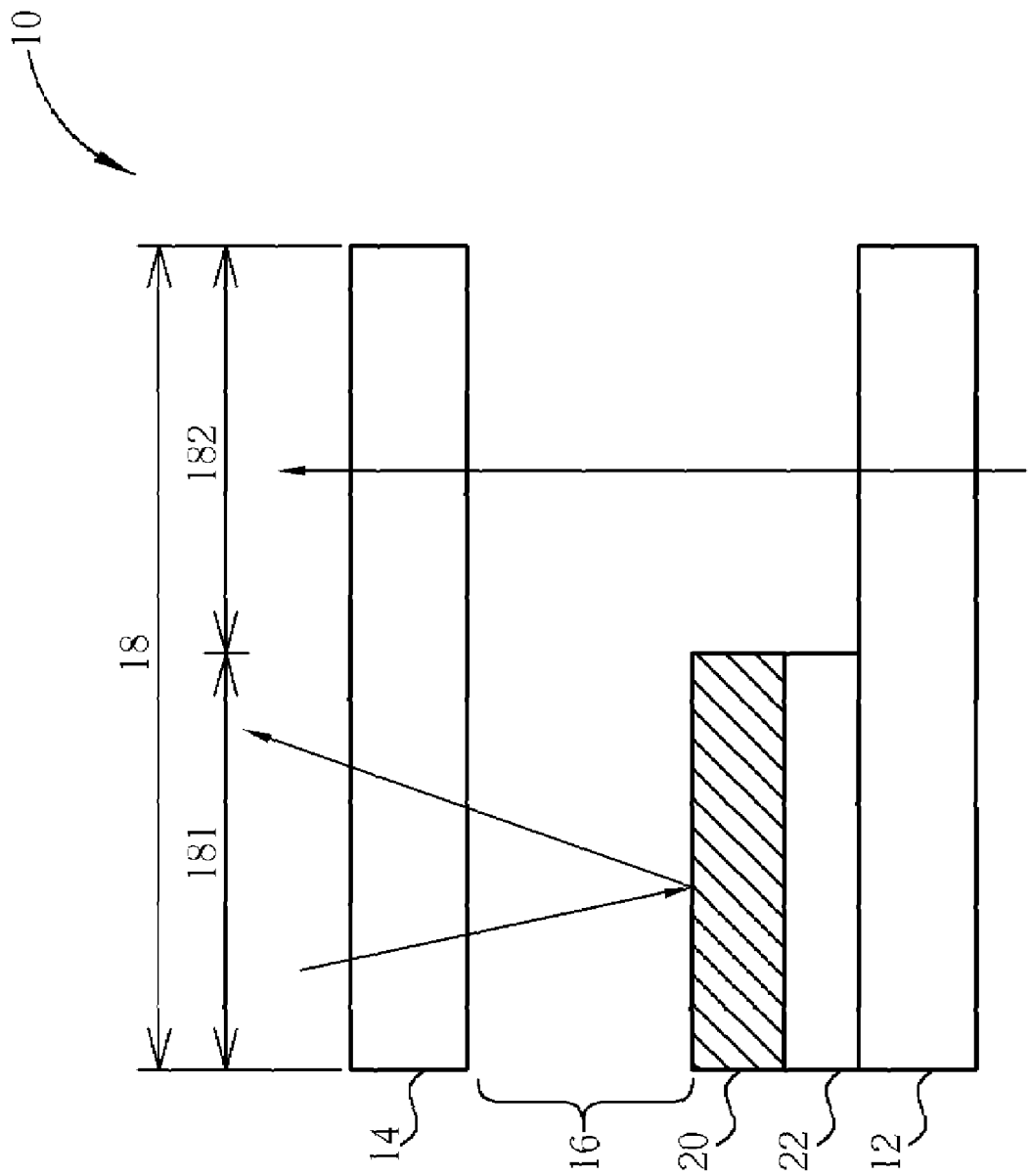
FIG. 1 is a schematic diagram of a transflective liquid crystal panel according to the prior art.
Figure 6:
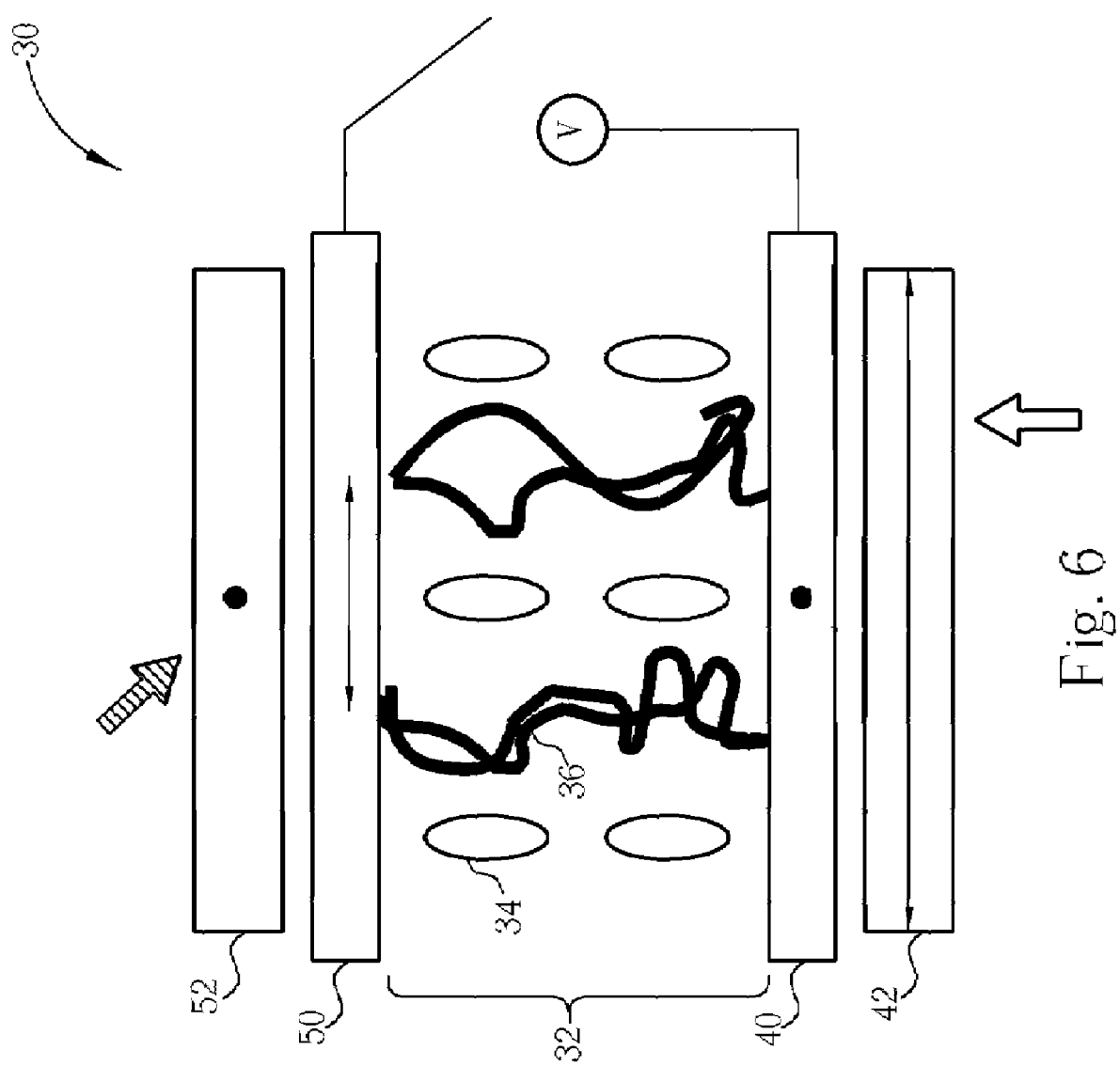
FIG. 6 to FIG. 11 are schematic diagrams of a transflective liquid crystal panel according to other embodiments of the present invention.
Figure 7:
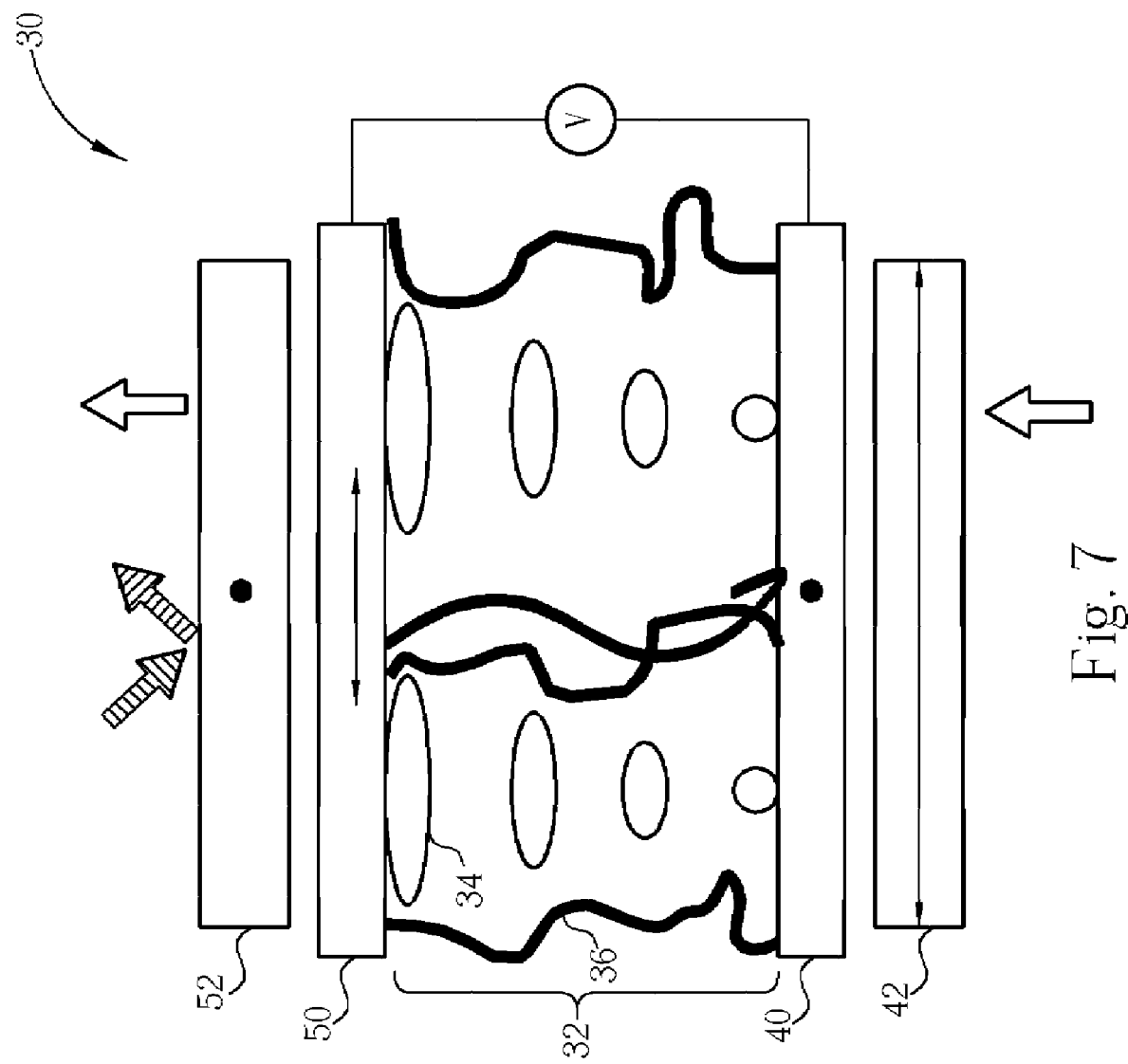
Figure 8:
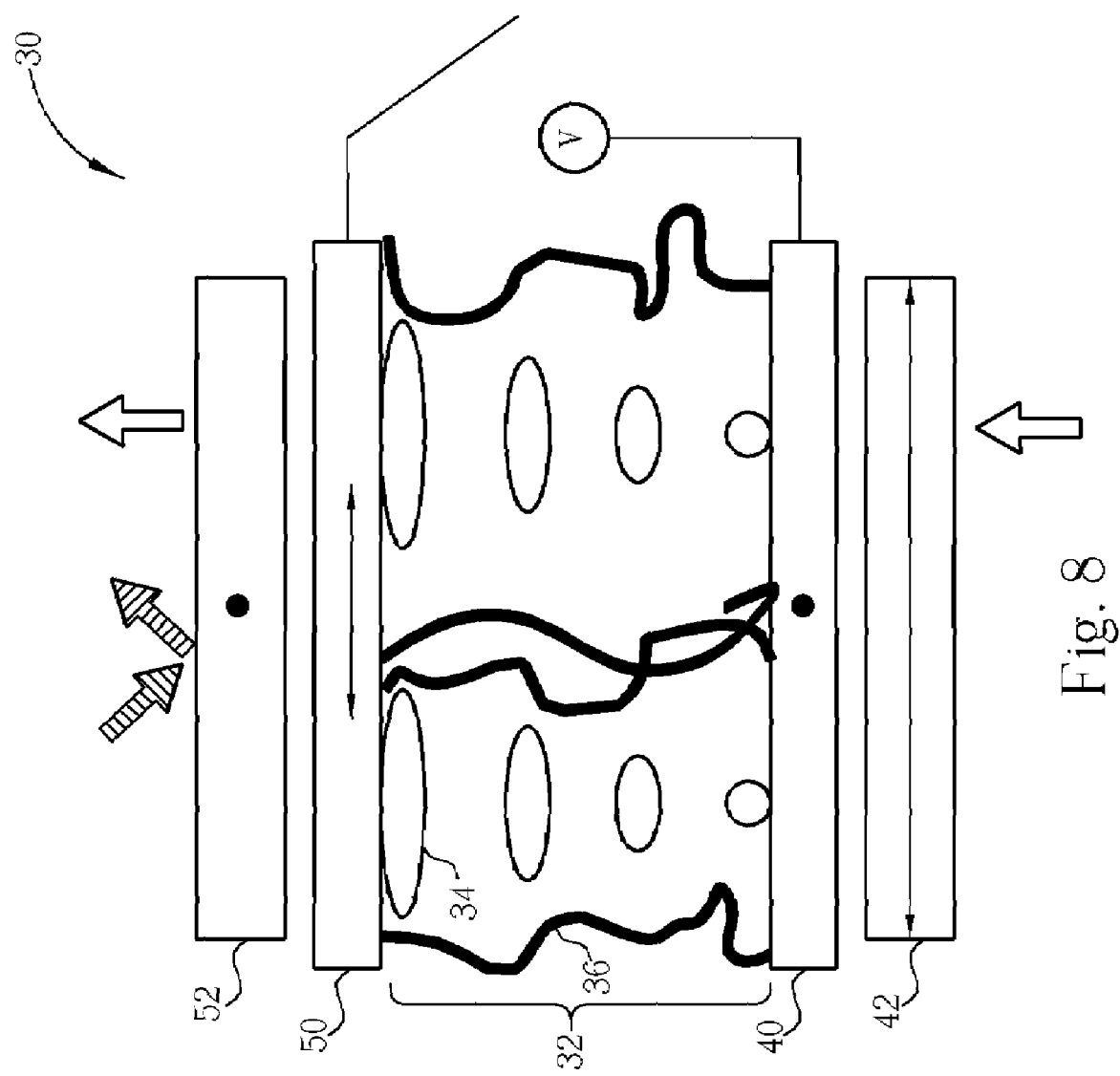
Figure 9:
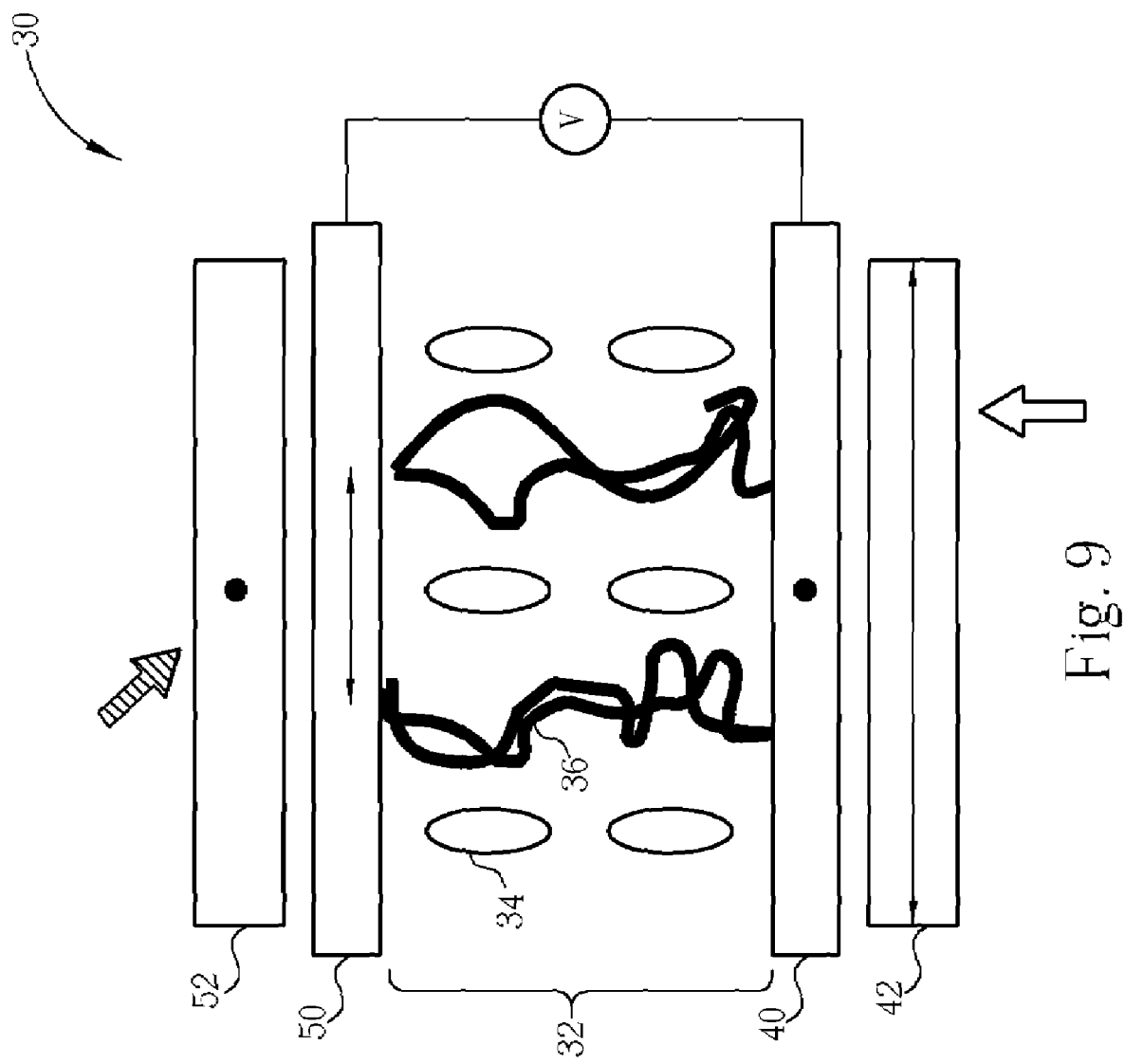
Figure 10:
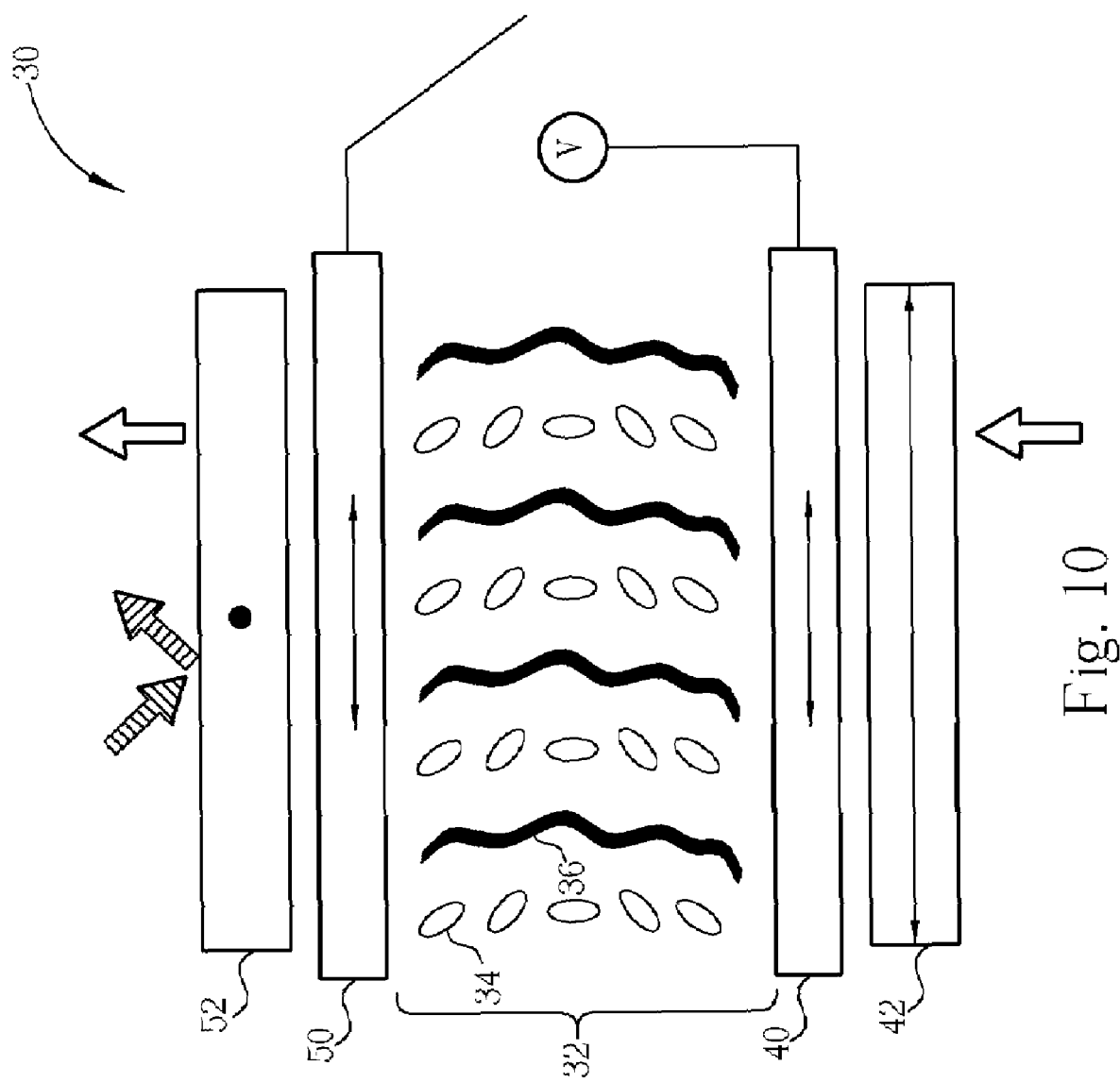
Figure 11:
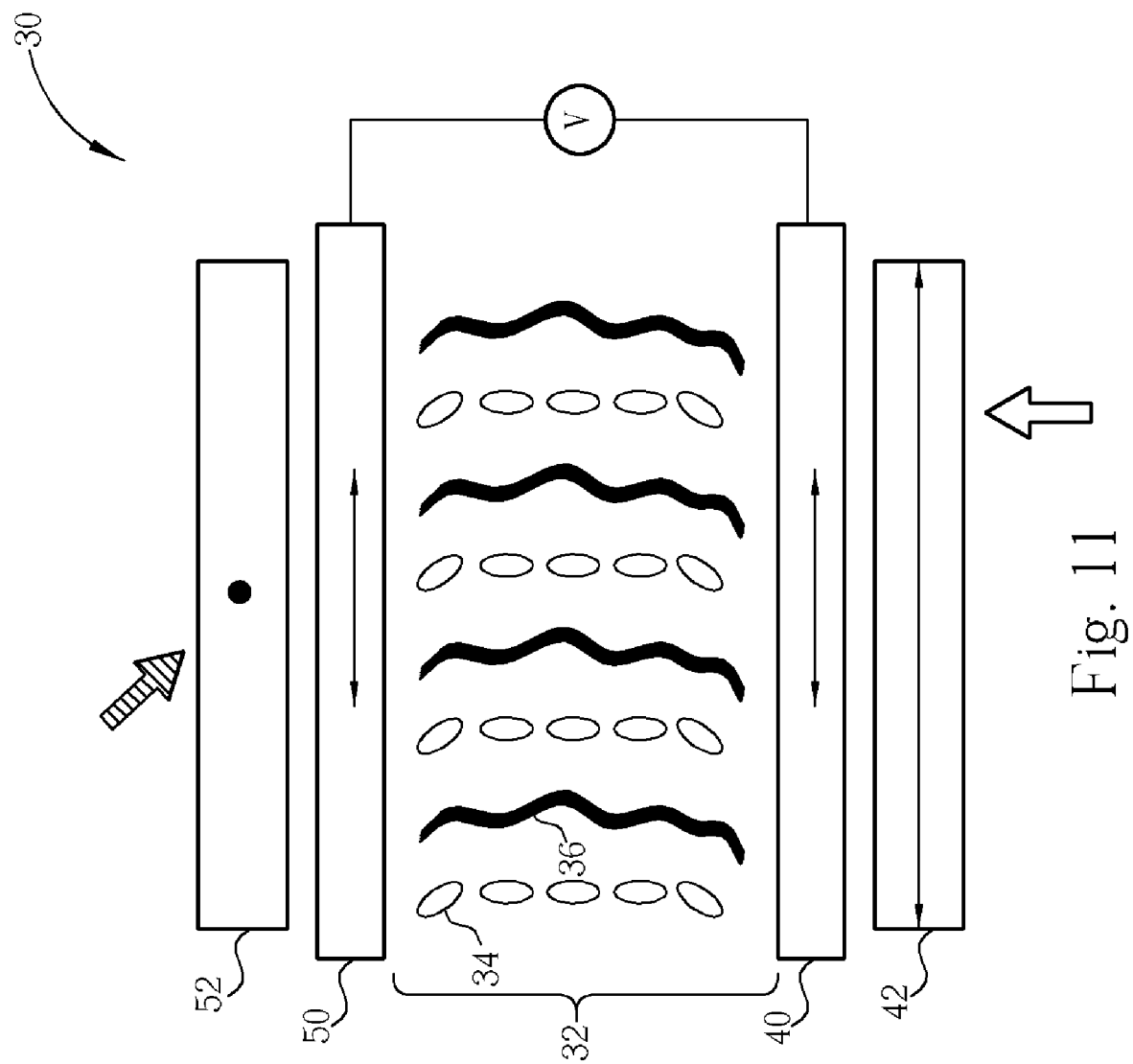

The above-mentioned embodiment is a normally black panel of optical compensated splay mode, but the transflective liquid crystal panel according to the present invention also comprises various kinds of embodiments. FIG. 6 to FIG. 11 are schematic diagrams of a transflective liquid crystal panel according to other embodiments of the present invention. FIG. 6 and FIG. 7 illustrate a normally black panel of vertical alignment-twist nematic mode. FIG. 8 and FIG. 9 illustrate a normally white panel of twist nematic mode. FIG. 10 and FIG. 11 illustrate a normally white panel of optical compensated bend (OCB) mode. In the following description, the device components of each embodiment have been detailed in the above-mentioned embodiment, and the polymer network and the precursors of each embodiment are also described as the above-mentioned embodiment. Therefore, redundant description is not included. Besides, in order to compare the difference of each embodiment according to the present invention, the devices in FIG. 6 to FIG. 1 will use the same reference characters as the ones in FIG. 2 to FIG. 3 where appropriate.

FIG. 6 is a schematic diagram of the transflective liquid crystal panel, when the voltage difference is equal to 0V, and FIG. 7 is a schematic diagram of the transflective liquid crystal panel when the voltage difference is not equal to 0V. The transflective liquid crystal panel 30 of the preferred embodiment is a normally black panel of the vertical alignment-twist nematic (VA-TN) mode. Therefore, the liquid crystal molecules 34 are negative liquid crystal molecules of vertical alignment and the array substrate 40 and the color filter substrate 50 are horizontal alignment. The difference between the preferred embodiment and the panel of optical compensated splay mode of the above-mentioned embodiment is that the directions of vertical alignment of the array substrate 40 and the color filter substrate 50 are perpendicular to each other. As shown in FIG. 6, when the voltage difference is equal to 0V, the liquid crystal molecules 34 relative to the array substrate 40 and relative to the color filter substrate 50 have pretilt angles, and the two angles are perpendicular to each other. For this reason, the liquid crystal molecules will be arranged in a homeotropic alignment. As shown in FIG. 7, when the voltage difference is not equal to 0V, the liquid crystal molecules will be arranged in twist nematic alignment.

As with the above-mentioned embodiment, when the voltage difference is equal to 0V, the polymer network 36 of the preferred embodiment do not affect the liquid crystal molecules 34, so the liquid crystal molecules 34 do not reflect incident light beams and are not pervious to the incident light beams. When the voltage difference is not equal to 0V, the liquid crystal molecules 34 affected by the polymer network 36 will be pervious to a backlight and scatter the backlight, and the liquid crystal molecules 34 will also reflect and scatter an ambient light. In the embodiment, the polymer network 36 is polymerized by heating or lighting ultraviolet.

FIG. 8 is a schematic diagram of the transflective liquid crystal panel, when the voltage difference is equal to 0V. FIG. 9 is a schematic diagram of the transflective liquid crystal panel, when the voltage difference is not equal to 0V. The transflective liquid crystal panel of the preferred embodiment is a normally white panel of twist nematic mode. Therefore, the liquid crystal molecules are nematic liquid crystal molecules, and the array substrate 40 and the color filter substrate 50 are horizontally aligned, and their aligned directions are perpendicular to each other.

Because the transflective liquid crystal panel 30 of the preferred embodiment is a normally white panel, when the voltage difference is equal to 0V, the polymer network 36 will affect the liquid crystal molecules to reflect incident light beams and be pervious to the incident light beams. When the voltage difference is not equal to 0V, the liquid crystal molecules do not reflect incident light beams and are not pervious to the incident light beams. As shown in FIG. 8, when the voltage difference is equal to 0V, the liquid crystal molecules will be formed in a twist nematic arrangement. At this time, the backlight can pass through the polymer dispersed liquid crystal layer 32 and be scattered. Simultaneously, the ambient light can be reflected by the polymer dispersed liquid crystal layer 32. As shown in FIG. 9, the liquid crystal molecules 34 relative to the array substrate 40 and relative to the color filter substrate 50 respectively have pretilt angles, and the two pretilt angles are perpendicular to each other. Therefore, the liquid crystal will be formed in homeotropic alignment along the two above-mentioned pretilt angles. At this time, the backlight cannot pass through the polymer dispersed liquid crystal layer 32, and the ambient light also cannot be reflected by the polymer dispersed liquid crystal layer 32. It is worthy to describe in the preferred embodiment that the polymer network 36 is polymerized by heating or lighting ultraviolet, when the voltage difference between the array substrate 40 and the color filter substrate 50 is not equal to 0V.

FIG. 10 is a schematic diagram of a transflective liquid crystal panel when the voltage difference is equal to 0V. FIG. 11 is a schematic diagram of the transflective liquid crystal panel when the voltage difference is not equal to 0V. The transflective liquid crystal panel of the preferred embodiment is a normally white panel of optical compensated bend mode of the normally white panel mode. Therefore, the liquid crystal molecules 34 are positive liquid crystal molecules, and the array substrate 40 and the color filter substrate 50 are horizontally aligned, and their aligned directions are parallel to each other.

As shown in FIG. 10, when the voltage difference is equal to 0V, the backlight can pass through the polymer dispersed liquid crystal layer 32 and be scattered, and the ambient light can be reflected by the polymer dispersed liquid crystal layer 32. As shown in FIG. 11, when the voltage difference is not equal to 0V, the liquid crystal molecules 34 will be arranged in optical compensated bend alignment. At this time, the backlight cannot pass through the polymer dispersed liquid crystal layer 32, and the ambient light also cannot be reflected by the polymer dispersed liquid crystal layer 32. Besides, in the preferred embodiment, the polymer network 36 is polymerized by heating or lighting ultraviolet when the voltage difference between the array substrate 40 and the color filter substrate 50 is equal to 0V.

The aforementioned embodiments are the transflective liquid crystal panel according to the preferred embodiment of the present invention. Nevertheless, the application of the present invention is not limited to the aforementioned embodiments, and the present invention can be applied to other kinds of transflective liquid crystal panels. It is worthy to describe that with various types of transflective liquid crystal panels, the polymerizing method of the polymer network according to the present invention are different.

Figure 12:
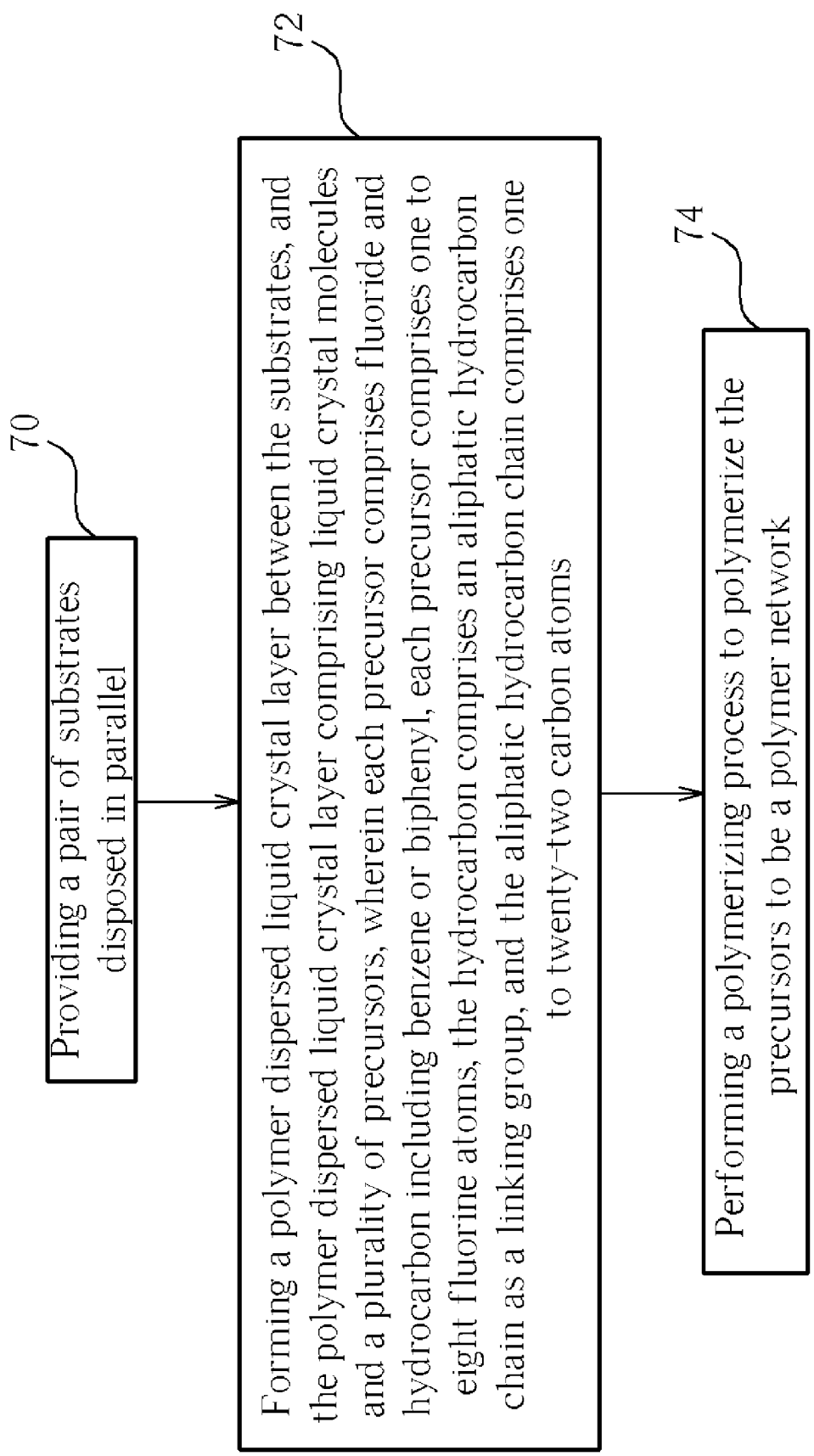
FIG. 12 is a flowchart of a method of fabricating a transflective liquid crystal panel according to the present invention.

FIG. 12 is a flowchart of a method of fabricating a transflective liquid crystal panel according to the present invention. As shown in FIG. 12, the method comprises:

Step 70: providing a pair of substrates disposed in parallel;

Step 72: forming a polymer dispersed liquid crystal layer between the substrates, and the polymer dispersed liquid crystal layer comprising a plurality of liquid crystal molecules and a plurality of precursors, wherein each precursor comprises fluoride and hydrocarbon including benzene or biphenyl, each precursor comprises one to eight fluorine atoms, the hydrocarbon comprises an aliphatic hydrocarbon chain served as a linking group, and the aliphatic hydrocarbon chain comprises one to twenty-two carbon atoms; and Step 74: performing a polymerizing process to polymerize the precursors to be a polymer network.

The polymer network according to the present invention is polymerized by the above-mentioned precursors. The condition of the polymerization can depend on the difference of the precursors to polymerize the precursors to be the polymer network by using the method of heating, lighting ultraviolet or other light with specific wavelength. In addition, with various types of the transflective liquid crystal panels, the method according to the present invention should be also adjusted. For example, if the transflective liquid crystal panel is optical compensated splay mode or twist nematic mode, the polymerization performs when the voltage difference between the substrates is equal to 0V. If the transflective liquid crystal panel is vertical alignment-twist nematic mode or optical compensated bend mode, the polymerization performs when the voltage difference between the substrates is not equal to 0V. Also, before performing the polymerization, the inner faces of the substrates facing each other must be handled with horizontal alignment such as using a rubbing process to make the liquid crystal molecules be arranged in predetermined direction. For the display panel having vertically aligned liquid crystal molecules, the horizontally aligned directions on the surface of the substrates are perpendicular to each other such as the liquid crystal molecules having vertical alignment-twist nematic mode. In this reason, the liquid crystal molecules have pretilt angles when the voltage difference is equal to 0V. For the liquid crystal panel of the optical compensated bend mode, the horizontally aligned directions on the surface of the substrates are parallel to each other.

In summary, the transflective liquid crystal panel according to the present invention uses the polymer network to improve the characteristic of the liquid crystal molecules. The liquid crystal molecules can have double functions of transmitting and reflecting at the same time, and moreover, the polymer network has the advantage of raising the scattering effect of the liquid crystal molecules, increasing the pretilt angle of the liquid crystal molecules and speeding the transition time of the liquid crystal molecules.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transflective liquid crystal panel, comprising:
    a first substrate;
    a second substrate;
    a first polarizer disposed on the first substrate;
    a second polarizer, disposed on the second substrate, having a transmission axis perpendicular to that of the first polarizer; and
    a polymer dispersed liquid crystal layer, sandwiched between the substrates, comprising a plurality of liquid crystal molecules and at least one polymer network.

2. The transflective liquid crystal panel of claim 1, wherein when a voltage difference between the first and the second substrates is not equal to 0V, the liquid crystal molecules reflect and/or are pervious to the incident light, and wherein when the voltage difference is equal to 0V, the liquid crystal molecules do not reflect and/or are not pervious to the incident light.

3. The transflective liquid crystal panel of claim 2, wherein the liquid crystal molecules are negative liquid crystal molecules.

4. The transflective liquid crystal panel of claim 3, wherein the liquid crystal molecules are vertically aligned, the substrates are horizontally aligned, and two horizontally aligned directions of the substrates are perpendicular to each other so that the liquid crystal molecules have pretilt angles, respectively relative to the substrates, and the two pretilt angles are perpendicular to each other.

5. The transflective liquid crystal panel of claim 3, wherein the liquid crystal molecules are vertically aligned, the substrates are horizontally aligned, and two horizontally aligned directions of the substrates are parallel to each other so that the liquid crystal molecules have pretilt angles, respectively relative to the substrates, and the two pretilt angles are parallel to each other.

6. The transflective liquid crystal panel of claim 1, wherein the polymer network comprises a plurality of precursors.

7. The transflective liquid crystal panel of claim 6, wherein the birefringence of the polymer network is substantially equal to that of the liquid crystal molecules.

8. The transflective liquid crystal panel of claim 6, wherein the precursor comprises at least one ultraviolet-polymerizable compound.

9. The transflective liquid crystal panel of claim 6, wherein the precursor comprises at least one heat-polymerizable compound.

10. The transflective liquid crystal panel of claim 1, wherein when a voltage difference between the first and the second substrates is equal to 0V, the liquid crystal molecules reflect and/or are pervious to the incident light, and wherein when the voltage difference is not equal to 0V, the liquid crystal molecules do not reflect and/or are not pervious to the incident light.

11. The transflective liquid crystal panel of claim 10, wherein the liquid crystal molecules are positive liquid crystal molecules.

12. The transflective liquid crystal panel of claim 11, wherein the substrates are horizontally aligned, and two horizontally aligned directions of the substrates are parallel to each other.

13. The transflective liquid crystal panel of claim 10, wherein the liquid crystal molecules are nematic liquid crystal molecules.

14. The transflective liquid crystal panel of claim 13, wherein the substrates are horizontally aligned, and two horizontally aligned directions of the substrates are perpendicular to each other.

15. The transflective liquid crystal panel of claim 10, wherein the polymer network comprises a plurality of precursors.

16. The transflective liquid crystal panel of claim 15, wherein the birefringence of the polymer network is substantially equal to that of the liquid crystal molecules.

17. The transflective liquid crystal panel of claim 15, wherein the precursors comprise at least one ultraviolet-polymerizable compound.

18. The transflective liquid crystal panel of claim 15, wherein the precursors comprise at least one heat-polymerizable compound.

19. A transflective liquid crystal panel, comprising:
a first substrate;
a second substrate;
a first polarizer disposed on the first substrate;
a second polarizer, disposed on the second substrate, having a transmission axis perpendicular to that of the first polarizer; and
a polymer dispersed liquid crystal layer, sandwiched between the substrates, comprising liquid crystal molecules and a polymer network, wherein the polymer network is polymerized by a plurality of precursors, each precursor including:
fluoride; and
hydrocarbon having benzene or biphenyl, and an aliphatic hydrocarbon chain, having one to twenty-two carbon atoms, served as a linking group.

20. The transflective liquid crystal panel of claim 19, wherein the precursors are substantially in the range of 2% to 20% of the liquid crystal molecules by weight.

21. The transflective liquid crystal panel of claim 19, wherein when a voltage difference between the first substrate and the second substrate is equal to 0V, the liquid crystal molecules do not reflect and/or are not pervious to the incident light, and wherein when the voltage difference is not equal to 0V, the liquid crystal molecules reflect and/or are pervious to the incident light.

22. The transflective liquid crystal panel of claim 19, wherein when a voltage difference between the first substrate and the second substrate is equal to 0V the liquid crystal molecules reflect and/or are pervious to the incident light, and wherein when the voltage difference is not equal to 0V, the liquid crystal molecules do not reflect and/or are not pervious to the incident light.

23. The transflective liquid crystal panel of claim 19, wherein the precursors comprise at least one ultraviolet-polymerizable compound.

24. The transflective liquid crystal panel of claim 19, wherein the precursors comprise at least one heat-polymerizable compound.

25. The transflective liquid crystal panel of claim 19, wherein the precursor has one to eight fluorine atoms.

* * * * *